(12) United States Patent
McAtee

(10) Patent No.: US 11,950,566 B2
(45) Date of Patent: Apr. 9, 2024

(54) FLOATING PET CONFINEMENT STRUCTURE WITH CAPSIZE AUTO-RELEASE

(71) Applicant: Joseph P. McAtee, Washington Crossing, PA (US)

(72) Inventor: Joseph P. McAtee, Washington Crossing, PA (US)

( * ) Notice: Subject to any disclaimer, the term of this patent is extended or adjusted under 35 U.S.C. 154(b) by 131 days.

(21) Appl. No.: 17/553,645

(22) Filed: Dec. 16, 2021

(65) Prior Publication Data
US 2023/0189753 A1 Jun. 22, 2023

(51) Int. Cl.
*A01K 1/02* (2006.01)

(52) U.S. Cl.
CPC .................................. *A01K 1/0245* (2013.01)

(58) Field of Classification Search
CPC .......... A63B 2225/605; A63B 2225/60; A63B 71/028; B63C 9/04; B63C 2009/042; B63C 2009/044; B63C 2009/084; B63C 9/06; B63C 9/065; B63C 9/30; A01K 1/0245; A63G 3/00; A63G 31/007; B63B 22/00; B63B 22/22; A63H 23/10; A41D 13/012
See application file for complete search history.

(56) References Cited

U.S. PATENT DOCUMENTS

| | | | |
|---|---|---|---|
| 3,509,855 A | 5/1970 | Priddy, Jr. | |
| 3,674,225 A * | 7/1972 | Johnson | ................ B63B 22/00 244/31 |
| 4,766,918 A * | 8/1988 | Odekirk | ................ E04H 15/30 441/38 |
| 4,799,910 A * | 1/1989 | Kellough | ................ B63B 34/54 441/130 |
| 5,007,212 A | 4/1991 | Fritts et al. | |
| 5,070,807 A * | 12/1991 | Lewis | ................ B63B 17/02 114/361 |
| D362,363 S * | 9/1995 | Friedman | ................ D6/595 |
| 5,615,640 A | 4/1997 | Luiz | |
| D409,971 S * | 5/1999 | Elsholz | ................ D21/803 |
| 6,354,245 B1 | 3/2002 | Roddy et al. | |
| D554,222 S * | 10/2007 | Peterson | ................ D21/803 |
| 8,616,932 B2 * | 12/2013 | Gelfond | ................ E04H 15/48 482/148 |
| 8,662,020 B1 | 3/2014 | Tecco | |

(Continued)

*Primary Examiner* — Tien Q Dinh
*Assistant Examiner* — Katelyn T Truong
(74) *Attorney, Agent, or Firm* — LaMort & Associates, P.C.

(57) ABSTRACT

A floating pet confinement system for the recreational enjoyment of small pet owners that enables a pet to safely float on water while remaining dry and confined. The system has a buoyant base that can be inflatable or molded. Holes are formed in the top surface of the buoyant base. A pet enclosure with an open bottom is set atop the top surface. The pet enclosure engages the holes on the buoyant base when the pet enclosure is upright. However, the pet enclosure is free to disengage from the holes and fall away from the buoyant base should the buoyant base tip. A pet is placed within the enclosure atop the buoyant base. Should the buoyant base tilt past a certain angle of inclination, the pet enclosure will fall away from the buoyant base. The pet is then free to exit the enclosure through the open base of the enclosure.

15 Claims, 7 Drawing Sheets

(56) References Cited

U.S. PATENT DOCUMENTS

| | | | | |
|---|---|---|---|---|
| 8,667,626 | B2 * | 3/2014 | Zheng | A63H 33/006 |
| | | | | 5/655 |
| D881,487 | S * | 4/2020 | Davis | D21/803 |
| 10,822,827 | B1 * | 11/2020 | Yan | E04H 15/02 |
| 2004/0224583 | A1 * | 11/2004 | Zheng | B63C 9/04 |
| | | | | 441/129 |
| 2010/0186793 | A1 | 7/2010 | Adamovich | |
| 2011/0079971 | A1 | 4/2011 | Lulevitch | |

\* cited by examiner

FLOATING PET CONFINEMENT STRUCTURE WITH CAPSIZE AUTO-RELEASE

BACKGROUND OF THE INVENTION

1. Field of the Invention

In general, the present invention relates to confinement structures for pets. More particularly, the present invention relates to confinement structures for pets that are designed to float on water.

2. Prior Art Description

Many people enjoy performing day to day activities in the company of their pets. Many pets are trained to follow their owners or do so by instinct. One area where a pet will often not follow an owner is into a body of water, such as a pool or lake. This is especially true of pets, such as cats, that have a natural aversion to water. As a result, if a pet owner wants to swim, the pet owner must leave their pet tied on a leash or confined in the home, car or other enclosed space. This separation can cause anxiety in both the pet and the owner of the pet. As will be explained, the present invention is directed toward designs that enables a pet owner to bring their pet into a calm body of water, such as a pool or a lake, in a manner that is safe and inviting to the pet.

In addition, on occasions, pets may have to be transported over water. For instance, during a sudden flood, a person may have to transport their pet over water to higher ground. Often, pets must be abandoned during emergencies. The pets then must be rescued by emergency personnel. A rescue worker cannot always carry a pet through water. Rather, the rescue worker needs a floating cage to confine and transport a pet safely across open water.

In the prior art, pet confinement cages have been designed for use by rescue workers. Such prior art is exemplified by U.S. Pat. No. 8,662,020 to Tecco and U.S. Patent Application Publication No. 2011/0079971 to Lulevitch. Such prior art devices are large and bulky to prevent capsizing. This is necessary because if the floating cage were to capsize, the pets within the floating cage could quickly drown.

The large size, heavy construction, and corresponding high cost of floating pet rescue cages make such products unappealing to ordinary pet owners. Furthermore, the prior art floating pet rescue cages are typically sized for medium to large dogs. Accordingly, the prior art floating cages have a significant volume below the waterline. In order for the prior art floating cage to be stable in the water, a significant ballast weight must be added to the floating cag to stabilize the floating cage. Accordingly, prior art floating cages may be useful for average to large sized dogs but can float too high in the water and unstable if only a small dog or cat is placed in the floating cage.

A need therefore exists for a lightweight, inexpensive confinement for a pet that is designed to float in a stable manner, regardless to the size and weight of the confined pet. Furthermore, a need exists for a floating confinement system that is lightweight and has a corresponding low displacement in water. A need also exists for a floating pet confinement that automatically releases the pet, should the pet confinement capsize in a body of water. In this manner a pet owner can conveniently and safely bring their pet with them when lounging in a pool or otherwise swimming in water. These needs are met by the present invention as described and claimed below.

SUMMARY OF THE INVENTION

The present invention is a floating pet confinement system that enables a pet to safely float on water while remaining dry and confined. The system has a buoyant base that can be inflatable or molded from a highly buoyant material, such as styrene foam. The buoyant base has a first area, a top surface, and a center of gravity.

A plurality of holes is formed in the top surface of the buoyant base. A pet enclosure is set atop the top surface of the buoyant base. The pet enclosure has an open bottom through which a pet can easily pass. When set on the buoyant base, the open bottom is obstructed by the underlying buoyant base. The pet enclosure engages the holes on the buoyant base when the pet enclosure is upright. However, the pet enclosure is free to disengage from the holes and fall away from the buoyant base should the buoyant base tip due to storm action, a passing boat wake and/or horseplay.

A pet is placed within the enclosure atop the buoyant base. The overall system, with the pet, can then be placed in a pool or another body of water. Should the buoyant base tilt past a certain angle of inclination, the pet enclosure will fall away from the buoyant base. The pet is then free to exit the enclosure through the open base of the enclosure. The floating pet confinement system is intended for use in calm bodies of water, such as pools and lakes, for the enjoyment of the pet and pet owner. The pet confinement system is intended for use with pets that can swim. Although intended for recreational use, the floating pet confinement system can also be used in emergencies to transfer pets over water.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention can be embodied in many ways, only two exemplary embodiments are illustrated. The exemplary embodiments are being shown for the purposes of explanation and description. The exemplary embodiments are selected in order to set forth two of the best modes contemplated for the invention. The illustrated embodiments, however, are merely exemplary and should not be considered limitations when interpreting the scope of the appended claims.

Figure 1:
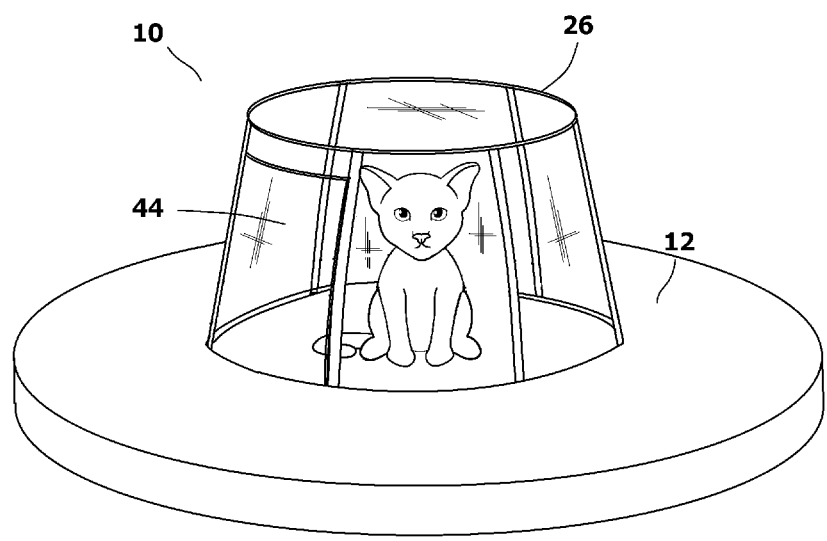
FIG. 1 is a perspective view of an exemplary embodiment of a floating pet confinement system.
Figure 2:
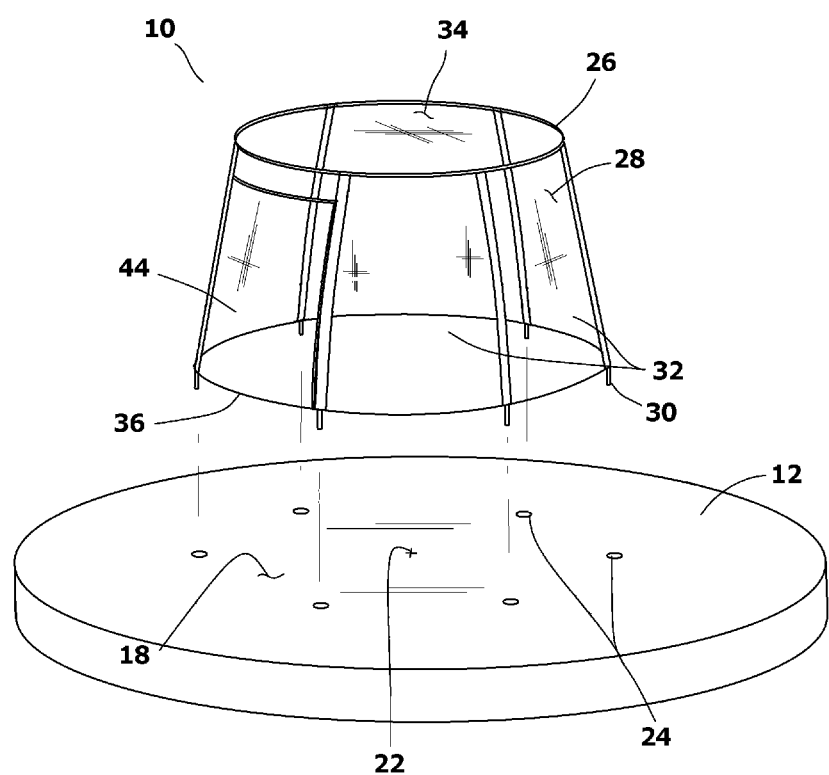
FIG. 2 is an exploded view of the exemplary embodiment of FIG. 1.
Figure 3:
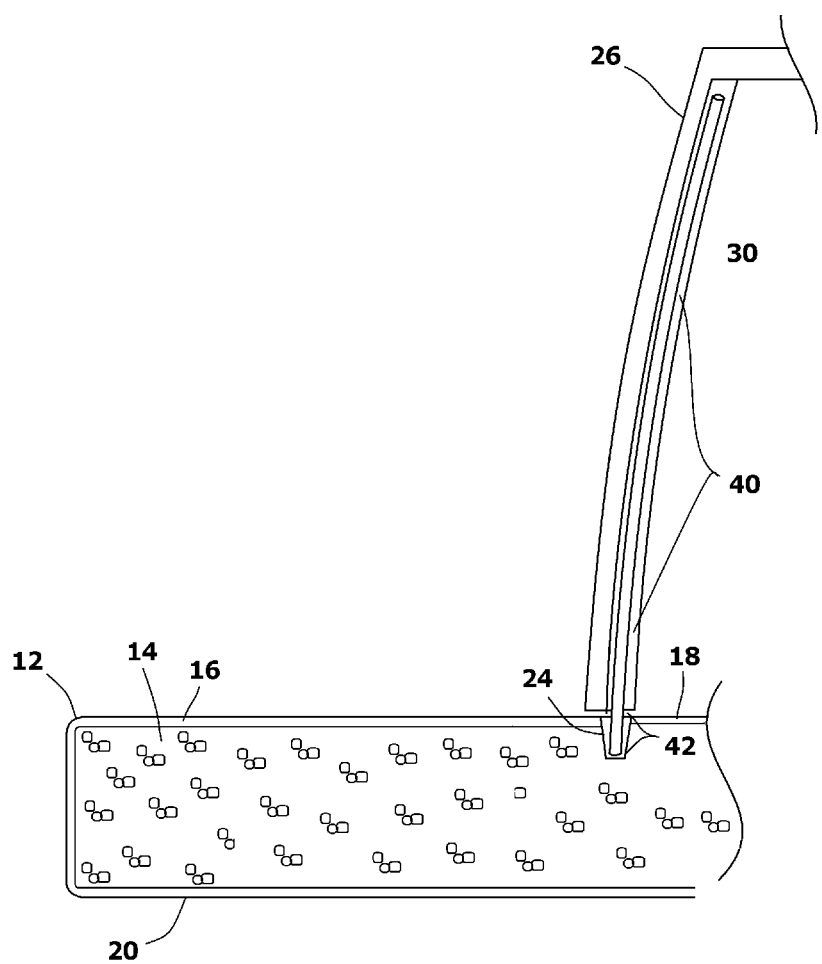
FIG. 3 is an enlarged cross-sectional view showing the interconnection of the pet enclosure with the buoyant base.

Referring to FIG. 1, FIG. 2, and FIG. 3, a floating pet confinement system 10 is shown. The pet confinement system 10 includes a buoyant base 12. The buoyant base 12 is made from a low-cost styrene foam 14, such as Styrofoam®, that is highly buoyant. The styrene foam 14 can be covered in a hydrophobic material 16, such as woven nylon, to help provide strength and structural integrity to the underlying styrene foam 14. The hydrophobic material 16 also helps prevent a pet from biting or clawing into the styrene foam 14.

The buoyant base 12 has a top surface 18 and a bottom surface 20. The buoyant base 12 has a center of gravity 22 near or at the geometric center of the top surface 18. A plurality of holes 24 are formed in the top surface 18 of the buoyant base 12 for a purpose that is later described. The thickness of the buoyant base 12 between the top surface 18 and the bottom surface 20 is preferably between three inches and six inches for small pets, such as cats and small dogs. The buoyant base 12 is preferably circular so as to be equally stable in all directions on the water. A preferred diameter is approximately thirty inches. However, polygonal shapes that are symmetrically formed about a center of gravity can also be used. The area of the buoyant base 12 depends upon the size of the pet to be supported. Although the present invention is primarily intended for use with small pets, such as cats, that weight under twenty pounds, larger version of the illustrated embodiment can be used for larger pets. It is preferred that the buoyant base 12 is able to displace at least twice the weight of the pet. As such, for a cat weighing ten pounds, a buoyant base 12 should be large enough to float at least twenty pounds.

An enclosure 26 is positioned atop the buoyant base 12. The enclosure 26 is preferably symmetrically centered atop the center of gravity 22 of the buoyant base 12. The enclosure 26 is made, in whole, or in part, from a mesh material 28. The mesh material 28 is supported in the shape of the enclosure 26 by frame elements 30. The mesh material 28 is hydrophobic so that it does not absorb water and become heavy. The mesh material 28 used is preferably fine enough and/or wide enough, so that a person can see through the mesh material 28. In this manner, a person can see a pet inside the enclosure 26 and the pet can see the person outside the enclosure 26. The mesh material 28 defines side walls 32 and a roof 34 for the enclosure 26. The enclosure 26 has an open bottom 36 through which a pet can easily pass. The open bottom 36 is obstructed by the buoyant base 12 when the enclosure 26 rests atop the buoyant base 12. The open bottom 36 is centered above the center of gravity 22 of the buoyant base 12.

The mesh material 28 is supported by one or more frame elements 30. The frame elements 30 pass into tubular corner seams 38 that are sewn into the mesh material 28. The frame elements 30 can be metal but are preferably plastic and are light enough to float. Each frame element 30 has a first section 40 that engages the mesh material 28 and a second section 42 that engages the buoyant base 12. The second sections 42 of the frame elements 30 extend into the holes 24 in the buoyant base 12. The holes 24 in the buoyant base 12 are wider than the frame elements 30. As such, the frame elements 30 only remain engaged with the buoyant base 12 when gravity biases the frame elements 30 into the holes 24 on the buoyant base 12.

At least one access opening 44 is formed into the enclosure 26. In the shown embodiment, the access opening 44 is shown on one of the side walls 32. However, it will be understood that the excess opening 44 can be formed into the roof 34 of the enclosure 26 as a matter of design choice. The access opening 44 can be selectively opened and closed. In the shown embodiment, the access opening 44 can be closed with a Velcro® closure 46. However, other closures, such as zipper closures or snaps connectors can also be used. The size of the access opening 44 depends upon the size of the enclosure 26 and the size of the pet intended to be placed within the enclosure 26.

Figure 4:
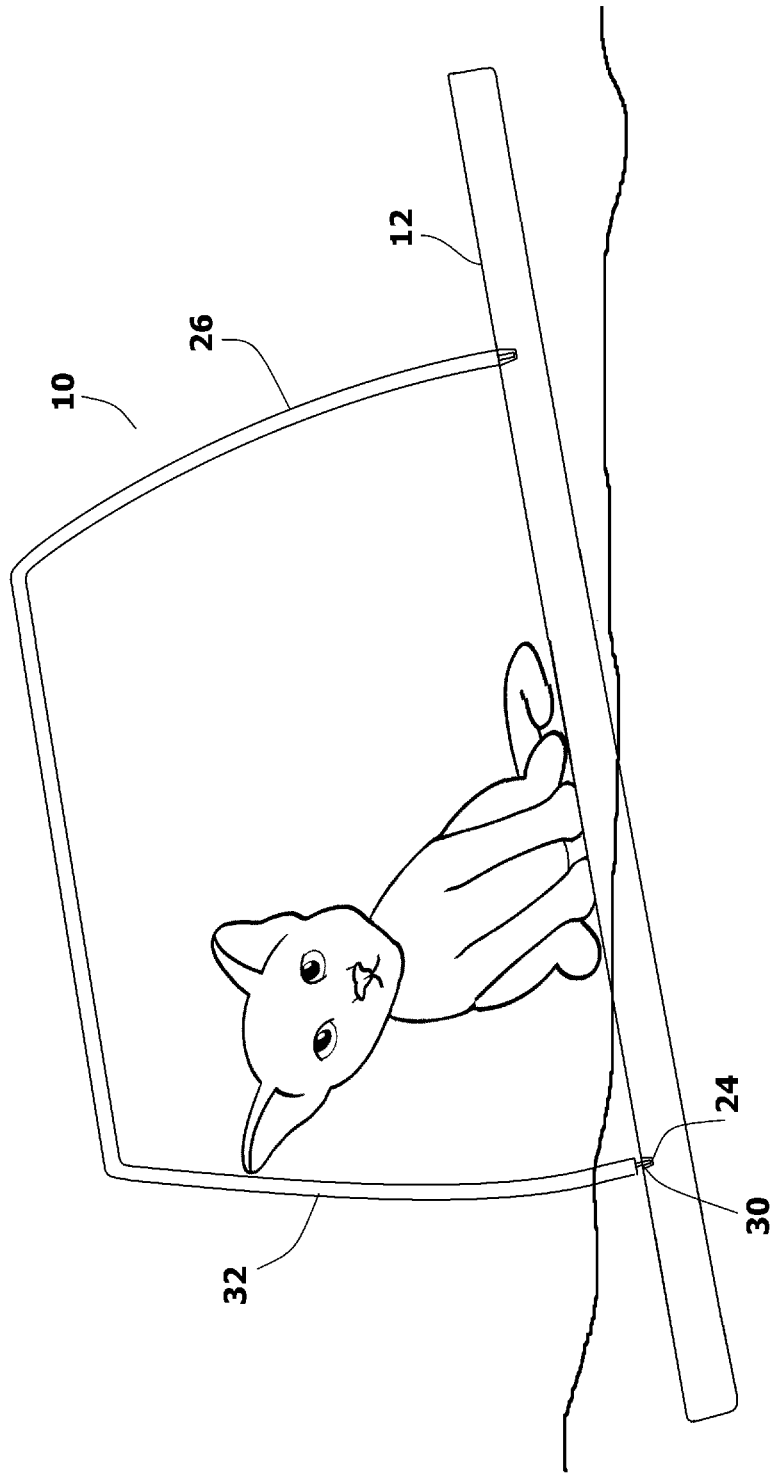
FIG. 4 is cross-sectional view of the exemplary embodiment of FIG. 1 retaining a pet and prior to achieving a tipping inclination.
Figure 5:
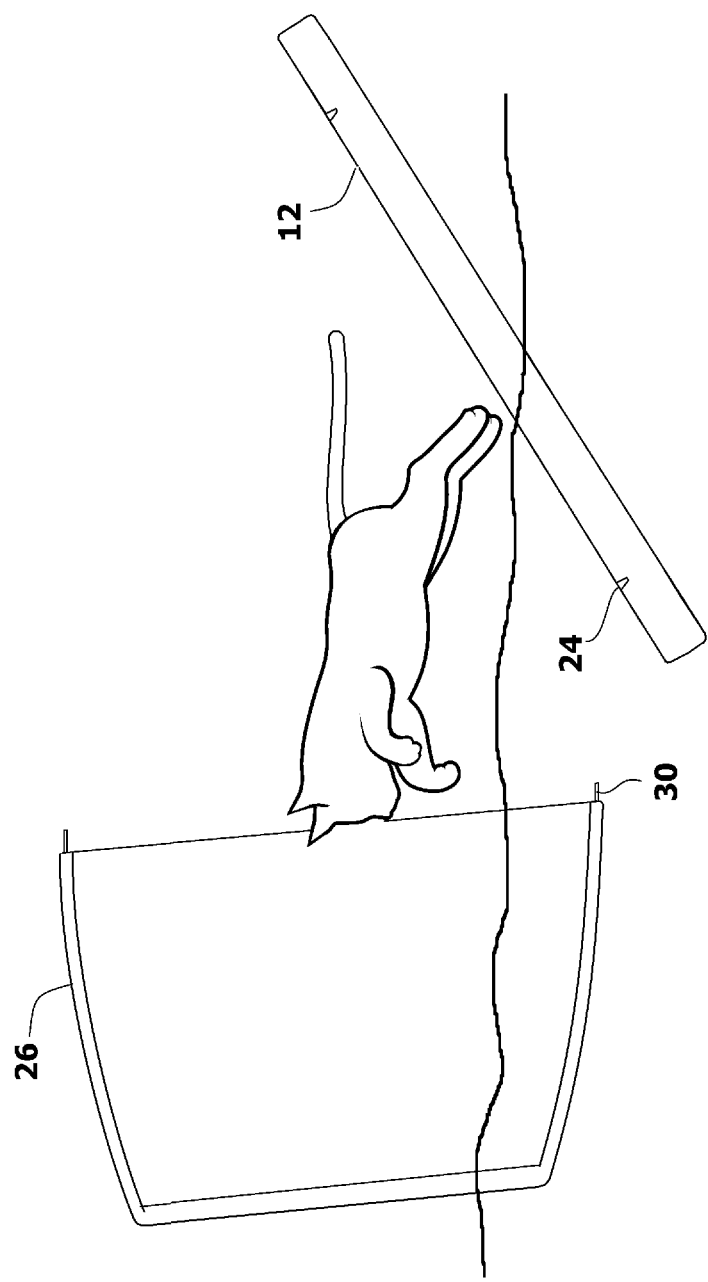
FIG. 5 is cross-sectional view of the exemplary embodiment of FIG. 1 achieving a tipping inclination.
Figure 6:
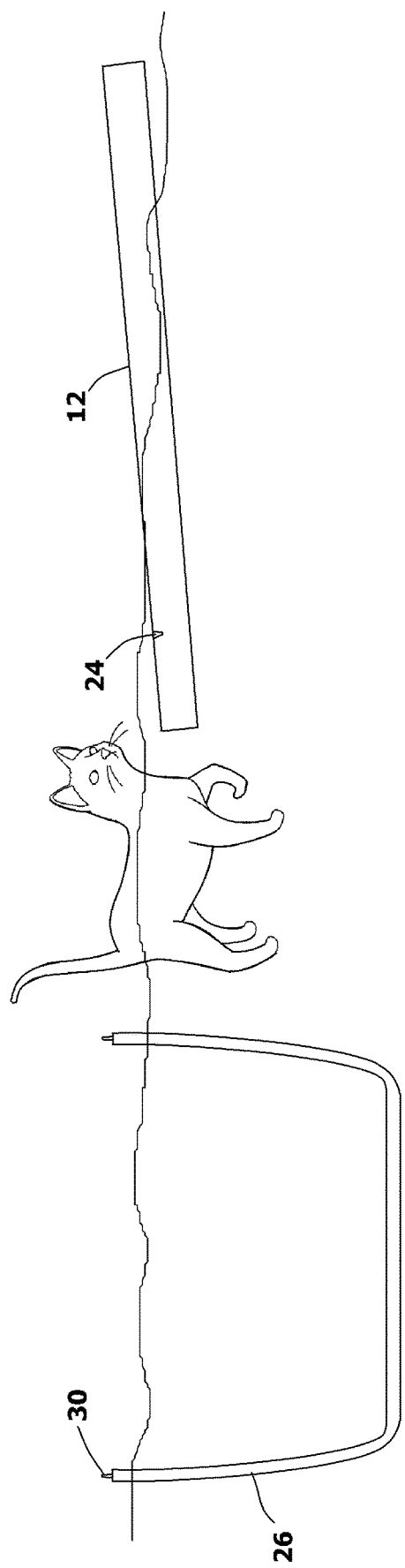
FIG. 6 shows the exemplary embodiment of FIG. 1 in a fully tipped configuration.

Referring to FIG. 4, FIG. 5 and FIG. 6 in conjunction with FIG. 1 and FIG. 2, it can be seen that a pet is placed in the enclosure 26 through the access opening 44. Once the pet is within the enclosure 26, the pet can safely float once placed in water. Accordingly, the pet can be set afloat in a pool, a lake, or on any other body of water. Once placed within the enclosure 26, the pet is confined on all sides. Accordingly, the movement of the pet is confined to the footprint of the open bottom 36 of the enclosure 26 on the buoyant base 12. The open bottom 36 rests upon a central area of the buoyant base 12. The buoyancy of the central area is less that the remaining buoyance of the buoyant base 12. Furthermore, the open bottom 36 of the enclosure 26 is centered atop the center of gravity 22 for the buoyant base 12. As a result, if the pet were to lean against any side of the enclosure 26, the overall pet containment system 10 would not approach its tipping point and would remain stable when floating on water.

On the water, the pet confinement system 10 moves in response to waves, wind and the movements of the pet in the enclosure 26. It has been determined that once the top surface 18 of the buoyant base 12 reaches a certain angle of inclination, a pet in the enclosure 26 is likely to lean against one of the side walls 32 toward the bottom of the inclination. Depending upon the size and type of pet, the angle of inclination that causes lean is typically between twenty degrees and forty degrees. Should the floating confinement system 10 tip, due to forces applied by the pet or external forces, then gravity no longer biases the enclosure 26 against the buoyant base 12. Once the buoyant base 12 reaches the set angle of inclination and the pet leans, the weight of the pet and enclosure is no longer centered. At this position, gravity and the lean of the pet act to bias the enclosure 26 away from the buoyant base 12. The frame elements 30 fall out of the larger holes 24 in the buoyant base 12. As a result, the enclosure 26 separates and falls away from the buoyant base 12. This frees the pet from the enclosure 26 well before the buoyant base 12 capsizes and the pet becomes disoriented. The freed pet can then swim to shore or swim onto the buoyant base 12.

Figure 7:
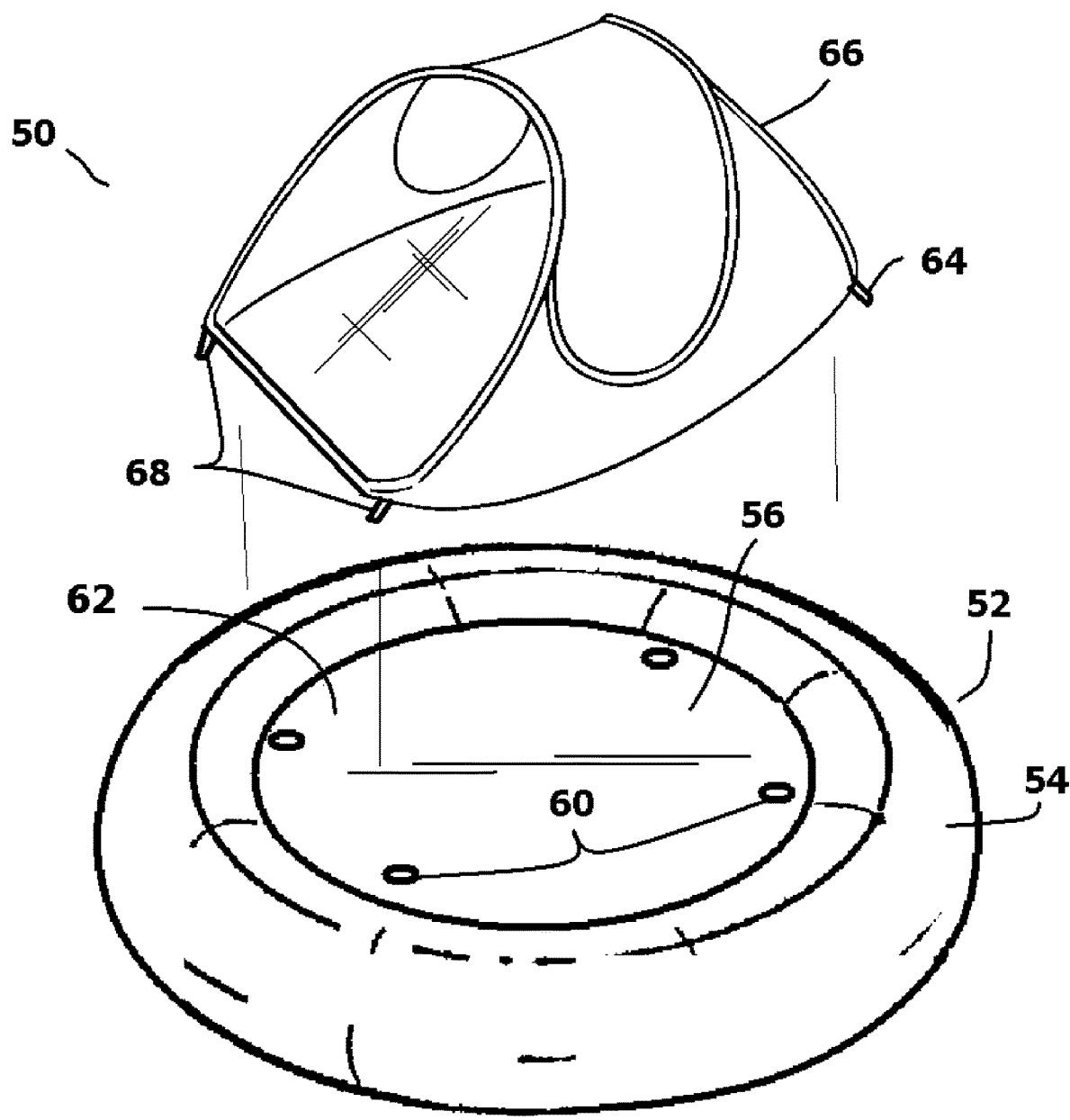
FIG. 7 is an alternate embodiment of a floating pet confinement system.

Referring to FIG. 7, an alternate embodiment of a floating pet confinement system 50 is shown. In this embodiment, a buoyant base 52 is provided that is inflatable. The buoyant base 52 has an inflatable inner tube 54. A cover 56 is provided that protects the inflatable inner tube 54 and spans the central opening of the inflatable inner tube 54. Grommets 60 are formed on the cover 56, wherein the grommets 60 serve as openings for receiving frame elements 64 of an enclosure 66.

The frame elements 64 are made from spring wire. Each frame element 64 is bent into a U-shape, wherein the ends 68 of the frame elements 64 engage the grommets 60 on the cover 56. The frame elements 64 support the mesh enclosure 66. Providing frame elements 64 in such a configuration enables the frame elements 64 to temporarily deform against the top surface 62 of the buoyant base 52. In this manner, when the buoyant base 52 is deflated, the overall floating pet confinement system 50 can be easily stored. As with the first embodiment of the invention, the enclosure 66 will fall way from the buoyant base 52 should the assembly flip in the water.

It will be understood that the embodiments of the present invention that are illustrated and described are merely exemplary and that a person skilled in the art can make many variations to those embodiments. For instance, the dimensions of the buoyant base and the enclosure can be varied for use with different sized pets. All such embodiments are intended to be included within the scope of the present invention as defined by the claims.

What is claimed is:

1. A floating pet confinement system, comprising:
 a buoyant base having a first area, a top surface, and a center of gravity;
 a plurality of holes formed in said top surface of said buoyant base, wherein each of said plurality of holes is of a first width;
 a pet enclosure set atop said top surface of said buoyant base, said pet enclosure having frame elements that support a fabric enclosure, wherein said frame elements have a second width that is smaller than said first width of each of said plurality of holes, and wherein said frame elements rest in said plurality of holes and only remain within said holes when biased into said holes by gravity, wherein said frame elements disengage from said holes and fall away from said buoyant base should said buoyant base tip beyond a certain angle of inclination.

2. The system according to claim 1, wherein said fabric enclosure is at least partially made of mesh material.

3. The system according to claim 1, wherein said pet enclosure is centered above said center of gravity of said buoyant base.

4. The system according to claim 1, wherein said pet enclosure has an open bottom.

5. The system according to claim 1, wherein buoyant base is mostly made of styrene foam.

6. The system according to claim 1, wherein said buoyant base is inflatable.

7. The system according to claim 1, wherein said pet enclosure can be compressed against said top surface of said buoyant base for storage.

8. The system according to claim 1, wherein said buoyant base is circular.

9. A floating pet confinement system, comprising:
 a buoyant base having a first area, a top surface, and a center of gravity, wherein holes are disposed in said top surface;
 a pet enclosure having frame elements that support a fabric enclosure, wherein said frame elements pass through said holes on said top surface of said buoyant base without contacting sidewalls of said holes, and rest on said buoyant base within said holes only when biased by gravity, wherein said frame elements automatically fall out of said plurality of holes enabling said pet enclosure to fall away from said buoyant base should said buoyant base tip beyond a set angle of inclination.

10. The system according to claim 9, wherein said set angle of inclination is at least as great as twenty-five degrees.

11. The system according to claim 9, wherein said pet enclosure is centered above said center of gravity of said buoyant base.

12. The system according to claim 9, wherein said pet enclosure has an open bottom.

13. The system according to claim 9, wherein said buoyant base is mostly made of styrene foam.

14. The system according to claim 9, wherein said buoyant base is inflatable.

15. The system according to claim 9, wherein said pet enclosure can be compressed against said top surface of said buoyant base for storage.

* * * * *